United States Patent [19]

Sakai et al.

[11] Patent Number: 4,754,422

[45] Date of Patent: Jun. 28, 1988

[54] DIVIDING APPARATUS

[75] Inventors: Tatsuya Sakai; Sakou Ishikawa, both of Hadano, Japan

[73] Assignee: Hitachi, Ltd., Tokyo, Japan

[21] Appl. No.: 686,657

[22] Filed: Dec. 27, 1984

[30] Foreign Application Priority Data

Dec. 28, 1983 [JP] Japan .................................. 58-245490

[51] Int. Cl.⁴ ............................ G06F 7/52; G05F 7/50
[52] U.S. Cl. .................................... 364/761; 364/764; 364/787
[58] Field of Search ............... 364/761, 762, 763, 764, 364/765, 766, 767, 737-739, 768, 784, 787

[56] References Cited

U.S. PATENT DOCUMENTS

| 3,234,367 | 2/1966 | Ottaway et al. | 364/761 |
| 3,873,820 | 3/1975 | Parr et al. | 364/739 |
| 4,337,519 | 6/1982 | Nishimoto | 364/765 X |
| 4,488,247 | 12/1984 | Inagami et al. | 364/765 |
| 4,549,280 | 10/1985 | Schomburg | 364/738 |

OTHER PUBLICATIONS

Bratun et al., *Multiply/Divide Unit for a High-Performance Digital Computer*, Nov. 1971, IBM Technical Disclosure Bulletin, vol. 14, No. 6, pp. 1813-1816.

K. G. Tan, *Uniform 2 Bits Quotients Binary Division by Carry-Save Adders*, IBM Technical Disclosure Bulletin, vol. 14, No. 11, Apr. 1972, pp. 3279-3281.

*Primary Examiner*—Gary V. Harkcom
*Assistant Examiner*—Long Thanh Nguyen
*Attorney, Agent, or Firm*—Antonelli, Terry & Wands

[57] ABSTRACT

A high-speed dividing apparatus includes a first, second and third carry save adders (CSA's) and the outputs of the first CSA are connected to the inputs of the second and third CSA's. The first CSA is capable of carrying out either the addition or the subtraction of a divisor. The second CSA is adapted to carry out the subtraction of a divisor, and the third CSA the addition thereof. A carry look-ahead logic is connected to each CSA. A quotient determining logic is adapted to determine quotient bits in response to outputs from CSA's and carry look-ahead logics. A selector control logic is adapted to control selectors in response to quotient bits so that outputs from one of the second and third CSA's and either a divisor or the complement thereof are selectively supplied to the inputs of the first CSA. An arbitrary number of stages can be arranged in a binary tree configuration in the same manner.

6 Claims, 3 Drawing Sheets

FIG. 3

| QUOTIENT | | CSAM INPUT | | |
|---|---|---|---|---|
| $D_1$ | $D_2$ | X | Y | Z |
| 0 | 0 | $\overline{HSA}$ | $\overline{HCA}$ | DR |
| 0 | 1 | $\overline{HSA}$ | $\overline{HCA①}$ | DR |
| 1 | 0 | $\overline{HSS}$ | $\overline{HCS}$ | $\overline{DR}$ |
| 1 | 1 | $\overline{HSS}$ | $\overline{HCS①}$ | $\overline{DR}$ |

$\overline{HSA}, \overline{HSS}$ : HSA, HSS SHIFTED 1 BIT LEFT
$\overline{HCA}, \overline{HCS}$ : HCA, HCS SHIFTED 1 BIT LEFT
$\overline{HCA①}, \overline{HCS①}$ : HCA, HCS SHIFTED 1 BIT LEFT WITH LSB = "1"
DR : DIVISOR
$\overline{DR}$ : 1'S COMPLEMENT OF DIVISOR

FIG. 4

| $C_1$ | $HC_0^*$ | $C_0^*$ | D |
|---|---|---|---|
| 0 | 0 | 0 | 0 |
| 0 | 0 | 1 | 1 |
| 0 | 1 | 0 | 1 |
| 1 | 0 | 1 | 0 |
| 1 | 1 | 0 | 0 |
| 1 | 1 | 1 | 1 |

$D = \overline{C_1} \cdot (HC_0^* + C_0^*) + C_1 \cdot HC_0^* \cdot C_0^*$

DIVIDING APPARATUS

BACKGROUND OF THE INVENTION

This invention relates to a dividing apparatus, and more particularly to a high-speed dividing apparatus for electronic digital computers.

A conventional basic binary dividing apparatus generates a quotient bit by bit while a divisor is added to or subtracted from a dividend or a partial remainder repeatedly in accordance with the non-restoring algorithm. There is an improved apparatus which is capable of generating a plurality of quotient bits in one cycle. This apparatus is designed to shift a partial remainder, add or subtract a suitable multiple of a divisor to or from the shifted partial remainder, and, based on the resultant partial remainder, estimate a plurality of quotient bits while determining the shift length of the partial remainder in preparation for the subsequent operation. However, the drawbacks of this apparatus reside in that it is difficult to reduce the cycle time since the shift length depends upon the result of each addition or subtraction.

Another improved apparatus of this kind which is designed with a view to eliminating these drawbacks is disclosed in Japanese Patent Publication No. 17188/1969. This improved apparatus is characterized in that two quotient bits can be obtained from the values of the upper three bits of both a partial remainder and a divisor with shift of a constant length. However, it requires the multiples by 0, $\frac{1}{4}$, $\frac{3}{4}$, 1, and 3/2 of a divisor, and the multiple by 3/2, among others, has to be prepared prior to starting a division. It is further necessary that normalization should be done before starting a division to shift a divisor until "1" appears in the MSB (Most Significant Bit) position, and also to shift a dividend by the same number of bits. Such various kinds of preparatory operations must be carried out prior to the starting of a division operation, so that much time is necessarily spent in carrying out various kinds of pre-processing steps in addition to the dividing operation itself. Moreover, a selector circuit which selects an appropriate multiple of a divisor in accordance with the values of a partial remainder and a divisor is required, which leads to an increase in the required amount of hardware.

Further, the above-described conventional dividing apparatuses utilize a full adder which is used for various kinds of computations other than division. Therefore, a plurality of selector circuits and various working registers are concerned in a dividing operation. Accordingly, the total operating time for carrying out a division cannot be reduced to the level theoretically estimated.

SUMMARY OF THE INVENTION

An object of the present invention is to provide an improved high-speed dividing apparatus.

Another object of the present invention is to provide an improved high-speed dividing apparatus of the type which is capable of generating a plurality of quotient bits in a single cycle.

Still another object of the present invention is to increase the operational speed of a dividing apparatus of the above-mentioned type without a particular increase in either the complexity of control or the amount of hardware.

A further object of the present invention is to provide a high-speed dividing apparatus of the type mentioned above which does not require any pre-processing operation, such as normalization and preparation of multiples of a divisor.

A further object of the present invention is to provide a high-speed dividing apparatus which is capable of generating a plurality of quotient bits within a period of time substantially equal to the one taken to calculate a carry which would occur in case of full addition.

In the dividing apparatus according to the present invention, a plurality of carry save adders are connected in a plurality of stages so as to form a binary tree. That is, the outputs of each of the carry save adders except the carry save adders in the final stage are connected in common to the inputs of two carry save adders in the subsequent stage. The carry save adder positioned at the root of the binary tree is arranged so that either the addition of a divisor or the subtraction thereof can be carried out selectively. The carry save adder positioned in one of the two branches extending from each branch point or node is arranged so that the addition of a divisor takes place, while the carry save adder positioned in the other branch is arranged so that the subtraction of a divisor takes place. A carry look-ahead circuit is connected to each carry save adder. This circuit is adapted to generate a carry which would occur if the full addition of a half sum and a half carry from the associated carry save adder were carried out. A quotient bit output from each stage is determined in response to outputs from the carry save adder and carry look-ahead circuit in the same stage and an output from the carry look-ahead circuit in the preceding stage. The outputs of one of the carry save adders in the final stage and either a divisor or the complement of it are selected in dependence on quotient bit outputs from respective stages, and supplied to the inputs of the carry save adder in the first stage which is positioned at the root of the binary tree.

The above and other objects as well as the characteristics and advantages of the invention will become apparent from the following description of the preferred embodiment taken in conjunction with the accompanying drawings.

BRIEF DESCRIPTION OF THE DRAWINGS

FIG. 3 is a diagram showing the relation between the values of quotient bits and the inputs to the initial stage in the apparatus of FIG. 1; and FIG. 4 is a diagram showing the relation between the values of carry bits and the value of a quotient bit in the apparatus of FIG. 1.

DESCRIPTION OF THE PREFERRED EMBODIMENT

Figure 1:
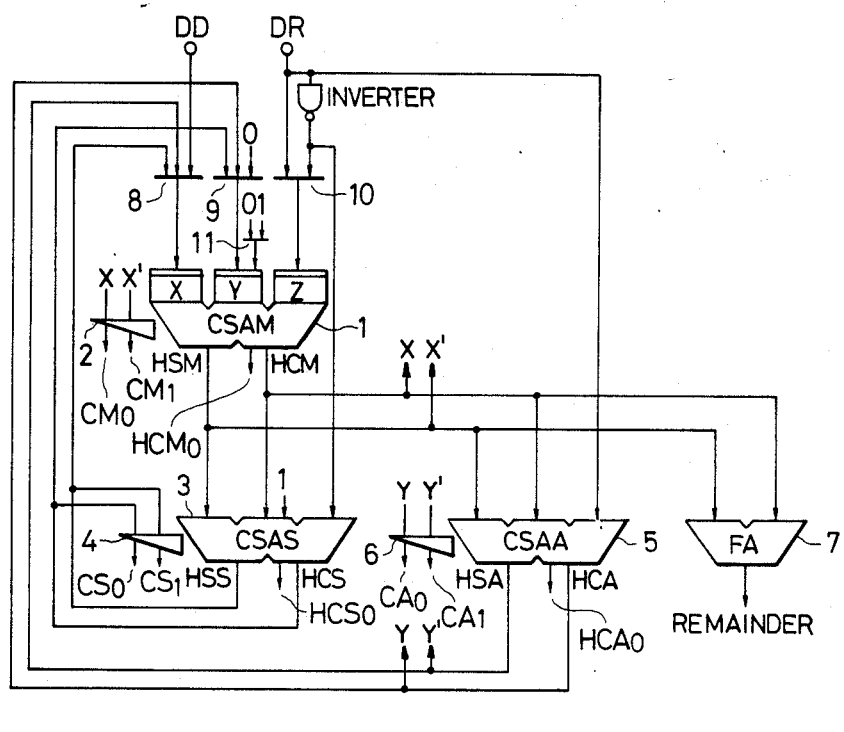
FIG. 1 is a block diagram of an embodiment of the present invention.

FIG. 1 schematically shows an embodiment of the present invention in the form of a binary dividing apparatus in which three carry save adders are connected in a two-stage binary tree configuration. This apparatus is adapted to generate two quotient bits in one operation cycle, and has such an operational speed that four quotient bits can be generated within one cycle time of a conventional dividing apparatus using a full adder.

Referring to the drawing, reference symbols CSAM 1, CSAS 3, CSAA 5 denote carry save adders for binary data of a desired number of bits. The carry save adder CSAM 1 corresponds to the root of a binary tree, the carry save adder CSAS 3 to one branch of the binary tree, which is adapted to carry out the subtraction of a divisor, and the carry save adder CSAA 5 to the other branch of the binary tree, which is adapted to carry out the addition of a divisor. As is well known, a carry save adder generates a half sum, i.e. a sum determined with all carries ignored, and a half carry, i.e. a carry occurring independently in respective places.

A half sum HSM and a half carry HCM, the outputs from the carry save adder CSAM 1, are shifted one bit to the left and applied to the two inputs of both carry save adder CSAS 3 and carry save adder CSAA 5. A divisor (which will hereinafter be referred to simply as "DR") is applied to the remaining input of CSAA 5. As for inputs to CSAS 3, the 1's complement of DR is applied to the remaining input, while the LSB (Least Significant Bit) of that input which receives HCM is set to "1". These measures are taken in order to form the 2's complement of DR for the substraction of DR. A half sum output HSS and a half carry outputs HCS from CSAS 3 as well as a half sum output HSA and a half carry output HCA from CSAA 5 are all shifted one bit to the left, and applied to selectors 8,9 arranged in front of the inputs of CSAM 1. Registers X,Y,Z are provided at the inputs of CSAM 1. After every round through the loop the data is set in these registers.

Reference symbols LACM 2, LACS 4, LACA 6 denote carry look-ahead logics adapted to generate carries $CM_0$, $CS_0$, $CA_0$, respectively, to the MSB, and carries $CM_1$, $CS_1$, $CA_1$, respectively, to a place one bit lower than the MSB (which will hereinafter be referred to as the "NSB"), which would occur if the respective two outputs from CSAM 1, CSAS 3, CSAA 5, i.e. a half sum and a half carry, were subjected to full addition.

Reference symbol FA 7 denotes a full adder for calculating a remainder in the final step of the computation. It is connected to receive the HSM output and the HCM output from CSAM 1 without being shifted.

Selectors 8, 9, 10, 11 are provided for selecting input data to be supplied to CSAM 1. The selector 8 operates to select the output HSS from CSAS 3, the output HSA from CSAA 5, or a dividend (which will hereinafter be referred to simply as "DD"), and the selector 9 operates to select the output HCS from CSAS 3, the output HCA from CSAA 5, or a fixed value (0). The selector 10 operates to select DR or the 1's complement of DR. The selector 11 operates to select "0" or "1" as a value of the LSB of an input to the register Y according to whether DR or the 1's complement of DR is selected by the selector 10. This selection means the execution of the addition of DR or the subtraction (addition of the 2's complement)of DR. The selectors 8,9 are controlled in response to a quotient bit output from the CSAM stage in the preceding operation cycle, and the selectors 10, 11 are controlled in response to a quotient bit output from CSAS stage or CSAA stage in the preceding operation cycle. A control logic 35 for these selectors will be described in detail later. At the start of a dividing operation, however, the selectors 8,9,10,11 select DD, a fixed value (0), the 1's complement of DR and a LSB value "1", respectively.

A quotient determining logic 36 is adapted to determine a quotient bit output from each stage, and the details of this logic will be described later.

In general, three inputs A,B,C, a half sum output HS and a half carry output HC of a carry save adder, and a carry $C_0$ to the MSB and a carry $C_1$ to the NSB obtained from a carry look-ahead circuit have the following relation if each input consists of 64 bits.

$$\begin{array}{r} A_0 A_1 \ldots A_{63} \\ B_0 B_1 \ldots B_{63} \\ C_0 C_1 \cdots C_{63} \\ \hline HS_0 HS_1 \ \ldots HS_{62} HS_{63} \\ +) \ HC_0 HC_1 HC_2 \ldots \ HC_{63} \\ \hline FS_0 FS_1 FS_2 \ldots FS_{63} FS_{64} \\ \underbrace{\phantom{FS_0}} \ \underbrace{\phantom{FS_1}} \\ C_0 \quad C_1 \end{array}$$

where:

$HS_i \ = \ A_i \oplus B_i \oplus C_i$ $HC_i \ = \ (A_i \cdot B_i) + (B_i \cdot C_i) + (C_i \cdot A_i)$ $\quad 1 = 0, 1, 2, \ldots, 63$ "$\oplus$": exclusive OR "$\cdot$": AND

"$+$": OR

FS = full sum of HS and HC $C_1 \ = \ (HS_1 \cdot HC_2) + \{(HS_1 + HC_2) \cdot HS_2 \cdot HC_3\} +$ $\quad \{(HS_1 + HC_2) \cdot (HS_2 \cdot HC_3) \cdot HS_3 \cdot HC_4\} + \ldots +$ $\quad \{(HS_1 + HC_2) \cdot (HS_2 \cdot HC_3) \cdot \ldots \cdot$ $\quad (HS_{61} + HC_{62}) \cdot HS_{62} \cdot HC_{63}\}$ $C_0 \ = \ (HS_0 \cdot HC_1) + \{(HS_0 + HC_1) \cdot C_1\}$ It should further be noted that, since HC is a carry from each bit position and has the weight of $2^1$ with respect to HS, HC is shifted one bit to the left when HC and HS are subjected to full addition.

Figure 2:
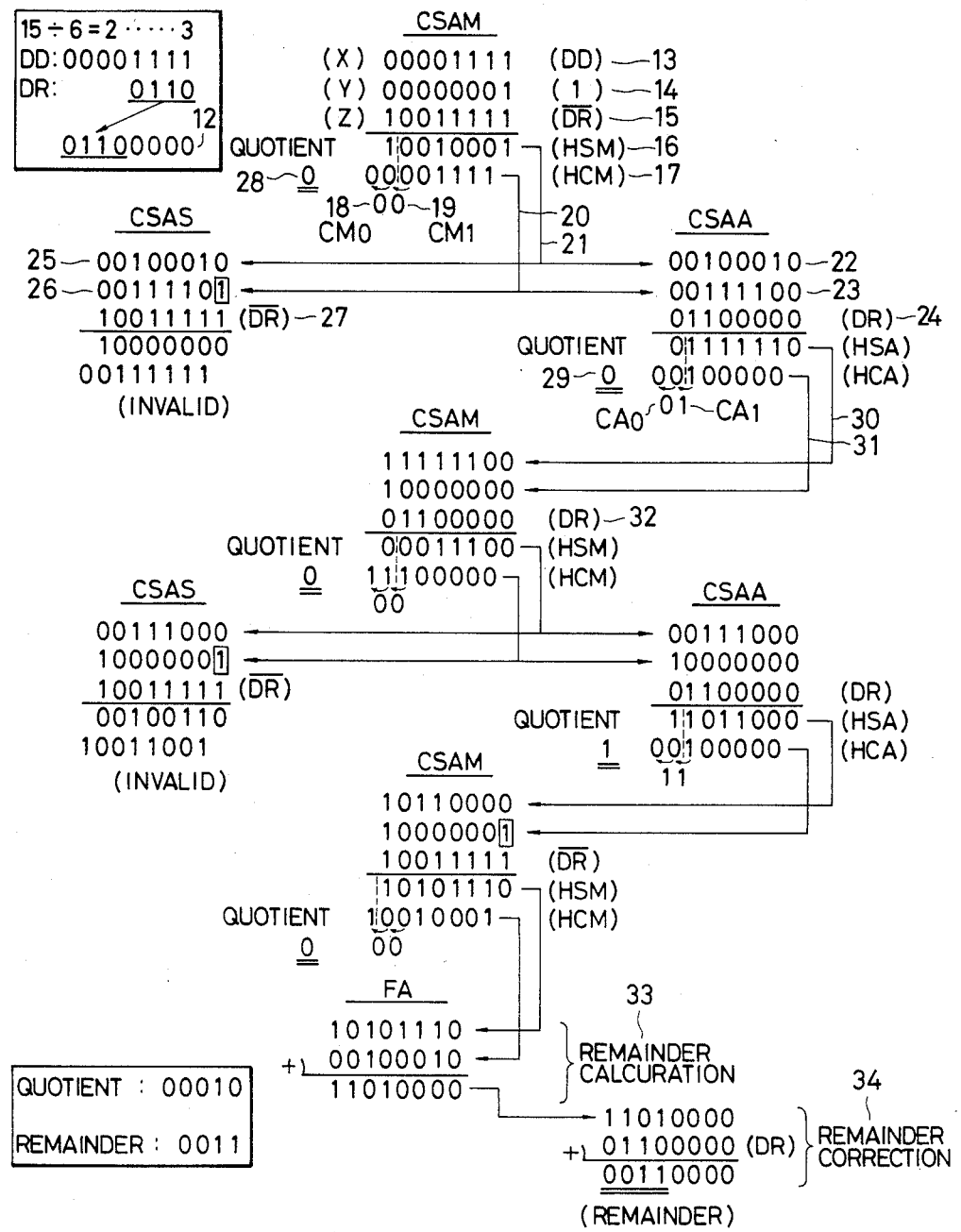
FIG. 2 illustrates an exemplifying dividing process carried out by the apparatus of FIG. 1.

The operation of the dividing apparatus shown in FIG. 1 will now be described with reference to FIG. 2 wherein the fixed point division of $(00001111) \div (0110)$ is adopted as an example and the carry save adders are assumed to be 8-bit wide device.

When the computation is started, DD 13, a fixed value (1) (a fixed value (0) from the selector 9 plus the LSB "1" from the selector 11) 14, and $\overline{DR}$ (the 1's complement of DR) 15 are supplied to the three inputs X, Y, Z of CSAM 1, and DR is subtracted from DD. Prior to the subtraction, DR is shifted to a position corresponding to the upper half portion of DD as shown by reference numeral 12. This subtraction causes outputs HSM 16 and HCM 17 to be generated, and LACM logic 2 then generates a carry $CM_0$ 18 to the MSB and a carry $CM_1$ 19 to the NSB. During the determination of $CM_0$ 18 and $CM_1$ 19, HSM 16 and HCM 17 are shifted by one bit to the left and sent to both CSAS 3 and CSAA 5 as shown by arrows 20, 21. In CSAA 5, which is supplied with DR 24 as well as HSM and HCM shifted to the left one bit 22, 23, the addition of DR takes place. On the other hand, in CSAS 3, which receives HSM shifted to the left one bit 25, HCM shifted to the left one bit with its LSB set to "1" 26, and the 1's complement of DR 27, the subtraction of DR takes place. In the meantime, the outputs of LACS 4 and LACA 6 are settled to complete the first operation cycle. At this point, a quotient bit 28 from the former stage, i.e. CSAM stage, is "0", and consequently a quotient bit from the addition branch is selected, in accordance with the non-restoring algorithm, as a quotient bit from the latter stage, hence a quotient bit 29, i.e. "0" from CSAA stage. Thus, two quotient bits 28, 29 are determined. The logic for determining quotient bits will be described in detail later.

In the second operation cycle, the selectors 8,9,10,11 are controlled according to the values of quotient bits obtained in the first operation cycle. FIG. 3 shows the data selectively supplied to CSAM 1 depending on the values of quotient bits. As shown in FIG. 3, when the quotient bit $D_1$ from the former stage in the preceding operation cycle is "0", HSA and HCA, the outputs from CSAA 5, are selected as X and Y inputs to CSAM 1, and, when $D_1$ is "1", HSS and HCS, the outputs from CSAS 3, are selected as the same inputs. When the quotient bit $D_2$ from the latter stage in the preceding operation cycle is "0", DR is selected as the Z input for the addition of DR. However, when $D_2$ is "1", the 1's complement of DR is selected as the Z input, and "1" as the LSB of the Y input, so that the 2's complement of DR is formed for the purpose of the subtraction of DR. The selector control logic 35 shown in FIG. 1 is adapted to control the selectors 8,9,10,11 according to what is shown in FIG. 3. In the example shown in FIG. 2, as the quotient bits obtained in the first operation cycle are "00", HSA and HCA are selected as shown by arrows 30, 31, and DR as shown by reference numeral 32.

The operations of CSAS 3 and CSAA 5 in the second operation cycle are similar to those in the first operation cycle. Subsequently, operations similar to those in the second operation cycle are repeated until a predetermined number (two in the example of FIG. 2) of rounds through the loop are completed, when, in conclusion, the full addition of HSM and HCM obtained from CSAS 1 is carried out by the full adder FA 7 to calculate the remainder as shown by reference numeral 33.

It should be noted that the division is carried out in this dividing apparatus in accordance with the non-restoring algorithm, and therefore, when the LSB of the quotient obtained is "0", the remainder must be corrected by further adding DR to the full sum of HSM and HCM. In the example shown in FIG. 2, the LSB of the quotient obtained from the CSAM stage after the operation is carried out round the loop twice is "0". Accordingly, the correction of the remainder is carried out as shown by reference numeral 34. This correction is done by a suitable full adder (not shown). Alternatively, FA 7 may be utilized for the correction of the remainder by switching its inputs.

The determination of a quotient bit will now be described. This dividing apparatus operates essentially in accordance with the non-restoring algorithm. Accordingly, the determination of each quotient bit must be done according to whether result of each subtraction or addition is positive or negative, in other words, whether a carry from the MSB position occurs or not during a normal full addition. However, for this dividing apparatus, in addition to a normal carry in the operating stage, the MSB of a half carry in the operating stage and a carry to the NSB occurring during the full addition of a half sum and half carry in the preceding stage must be taken into account. The reason is that a carry which would have propagated and been shifted out if a full addition had been executed is contained latently in a half sum and half carry sent from the preceding stage. Since such a latent carry can occur, it is necessary to judge whether a carry generated in the operating stage is one reflecting a true quotient bit or no other than a latent carry from the preceding stage being revealed.

FIG. 4 shows a quotient bit determining logic. A carry "1" to the NSB generated during the full addition of a half sum and half carry in the preceding stage (obtained from the carry look-ahead logic) indicates the existence of a latent carry. Let $C_0^*$ and $HC_0^*$ respectively represent a carry to the MSB during the full addition of a half sum and half carry (namely, the MSB of an output from the carry look-ahead logic) and the MSB of a half carry in the operating stage, and $C_1$ a carry to the NSB during the full addition of a half sum and half carry in the preceding stage (namely, a bit subsequent to the MSB of an output from the carry look-ahead logic). If $C_1=0$, then either $C_0^*$ or $HC_0^*$ is a carry which reflects a quotient bit. However, it is impossible that both $C_0^*$ and $HC_0^*$ are "1" in the operating stage when $C_1=0$, and consequently there is no case of $[C_0^*=1$ and $HC_0^*=1]$ when $C_1=0$. On the other hand, it is only when $[C_0^*=1$ and $HC_0^*=0]$ or when $[C_0^*=0$ and $HC_0^*=1]$ that a latent carry alone occurs when $C_1=1$. In the former case, a carry is transmitted still in a latent state from the operating stage to the succeeding stage, and, in the latter case, a latent carry reveals itself in the operating stage. Further, if $C_1=1$ and $[C_0^*=1$ and $HC_0^*=1]$, it indicates that both a latent carry from the preceding stage and a quotient-reflecting carry occur. However, it is impossible that no carries occur at all in the operating stage when $C_1=1$. Accordingly, there is no possibility of $[C_0^*=0$ and $HC_0^*=0]$ when $C_1=1$. The above may be summarized in that a quotient bit D in the operating stage can be expressed by the equation, $$D=\overline{C_1}(C_0^* HC_0^*)+(C_1 C_0^* HC_0^*)$$

The quotient determining logic 36 shown in FIG. 1 is adapted to determine quotient bit outputs from respective stages ($D_1$ and $D_2$ in FIG. 3) in accordance with the relation shown in FIG. 4 or the equation shown above.

As is clear from the above description, according to the present invention it is unnecessary to carry out a full addition actually for determining a quotient, but it is only necessary to determine a carry which would occur in case of full addition. The carry save adder can be formed in a single-stage logic, so that the greater part of the operation time is spent in determining a carry in the carry look-ahead logic. Let the time required for carrying out a normal full addition be one cycle time. It is possible that a bare carry is determined within half a cycle time. If a binary tree configuration is employed as taught by the present invention, the starting of the operations of LACA and LACS in the latter stage is delayed with respect to that of LACM in the former stage by only the operation time of CSAA or CSAS. Accordingly, all outputs from LACM, LACA, LACS can be obtained in a period of time substantially equal to one operation time of a carry look-ahead logic. That is, two quotient bits can be obtained within half a cycle time for a conventional dividing apparatus using a full adder. Thus, a dividing apparatus capable of determining four quotient bits within one cycle time can be formed, which enables a division operation to be carried out within a time which is a half of that required by the dividing apparatus of the aforementioned Japanese Patent Publication No. 17188/1969.

The above-described embodiment has the simplest construction, i.e. a 2-stage construction. It can be expanded easily into a 3-stage construction by connecting the respective outputs of CSAS 3 and CSAA 5 to two other carry save adders. The resultant apparatus is capable of obtaining 3 quotient bits in one cycle thereof. This means that this apparatus enables 6 quotient bits to be obtained within one cycle time of a conventional dividing apparatus using a full adder. If the binary tree structure is further expanded successively in the same manner, a dividing apparatus capable of generating more quotient bits in one cycle can be obtained.

The dividing apparatus according to the present invention described above is capable of obtaining a plurality of quotient bits within a period of time which is required for determining only a carry which would occur in case of full addition. Moreover, this apparatus does not require any pre-processing operation, such as a normalization operation and an operation for producing multiples of a divisor. Therefore, a high-speed division is attained without a noticable increase in either the complexity of control or the amount of hardware.

We claim:

1. A dividing apparatus for generating a plurality of quotient bits in a single operation cycle according to a non-restoring algorithm, comprising:

a plurality of carry save adders, each for generating a half sum output and a half carry output, connected in a plurality of stages so that the first stage includes a single carry save adder and the outputs of each carry save adder in each stage except for the final stage are supplied in common to a different pair of carry save adders in a subsequent stage, thereby forming a binary tree having its root in the first stage, the carry save adder in the first stage being adapted for both the addition and the subtraction of a divisor, one carry save adder of said pair of carry save adders being adapted for the addition of said divisor, and the other carry save adder of said pair of carry save adders being adapted for the subtraction of said divisor;

a plurality of carry look-ahead circuits each connected to one of said carry save adders for generating a carry which would occur in case of the full addition of the half sum output and the half carry output from the carry save adder connected thereto;

quotient determining means for determining a quotient bit output from each stage in response to outputs from the carry save adder and the carry look-ahead circuit in each stage and the carry look-ahead circuit in its preceding stage; and selector means for selecting outputs from one of the carry save adders in the final stage and either said divisor or a complement thereof in response to quotient bit outputs from respective stages to supply to the inputs of the carry save adder in the first stage.

2. A dividing apparatus as claimed in claim 1 wherein said quotient determining means operates in response to the most significant bit of a half carry from the carry save adder in each stage, a carry to the most significant bit obtained from the carry look-ahead circuit in the same stage, and a carry to a bit next to the most significant bit obtained from the carry look-ahead circuit in its preceding stage.

3. A dividing apparatus as claimed in claim 1 wherein said selector means is adapted to supply a dividend and a complement of said divisor to the inputs of the carry save adder in the first stage when a dividing operation starts.

4. A dividing apparatus as claimed in claim 1 wherein said apparatus further includes a full adder for calculating a remainder.

5. A dividing apparatus as claimed in claim 1, wherein the outputs of each of the carry save adders are shifted left by one bit when supplied to the receiving pair of carry save adders, and said selector means supplies the outputs of the selected carry save adder shifted left by one bit to the carry save adder in the first stage.

6. A dividing apparatus comprising:

a first carry save adder for carrying out either divisor subtraction or divisor addition to generate a first half sum and a first half carry;

a second carry save adder connected to receive from said first carry save adder the first half sum and the first half carry both shifted left by one bit for carrying out divisor addition to generate a second half sum and a second half carry;

a third carry save adder connected to receive from said first carry save adder the first half sum and the first half carry both shifted left by one bit for carrying out divisor subtraction to generate a third half sum and a third half carry;

first second and third carry look-ahead circuits connected to said first, second and third carry save adders, respectively, each carry look-ahead circuits being connected to receive the half sum and the half carry from the carry save adder, connected thereto to generate a carry which would occur in the case of a full addition of the received half sum and half carry;

a quotient determining logic circuit for determining a quotient bit output according to the first half carry, a carry from the first carry look-ahead circuit and a carry from either the second or third carry look-ahead circuit, and for determining a second quotient bit according to either the second or third half carry, a carry from either the second or third carry look-ahead circuit and a carry from the first carry look-ahead circuit; and selection means for selecting outputs from one of the second and the third carry save adder and either said divisor or a complement thereof in response to the first and the second quotient bit for supply to the first carry save adder.

* * * * *